R. V. HITSCHMANN.
DEVICE FOR APPLYING LEATHER FACINGS TO PULLEYS.
APPLICATION FILED APR. 24, 1913.
1,085,424.
Patented Jan. 27, 1914.
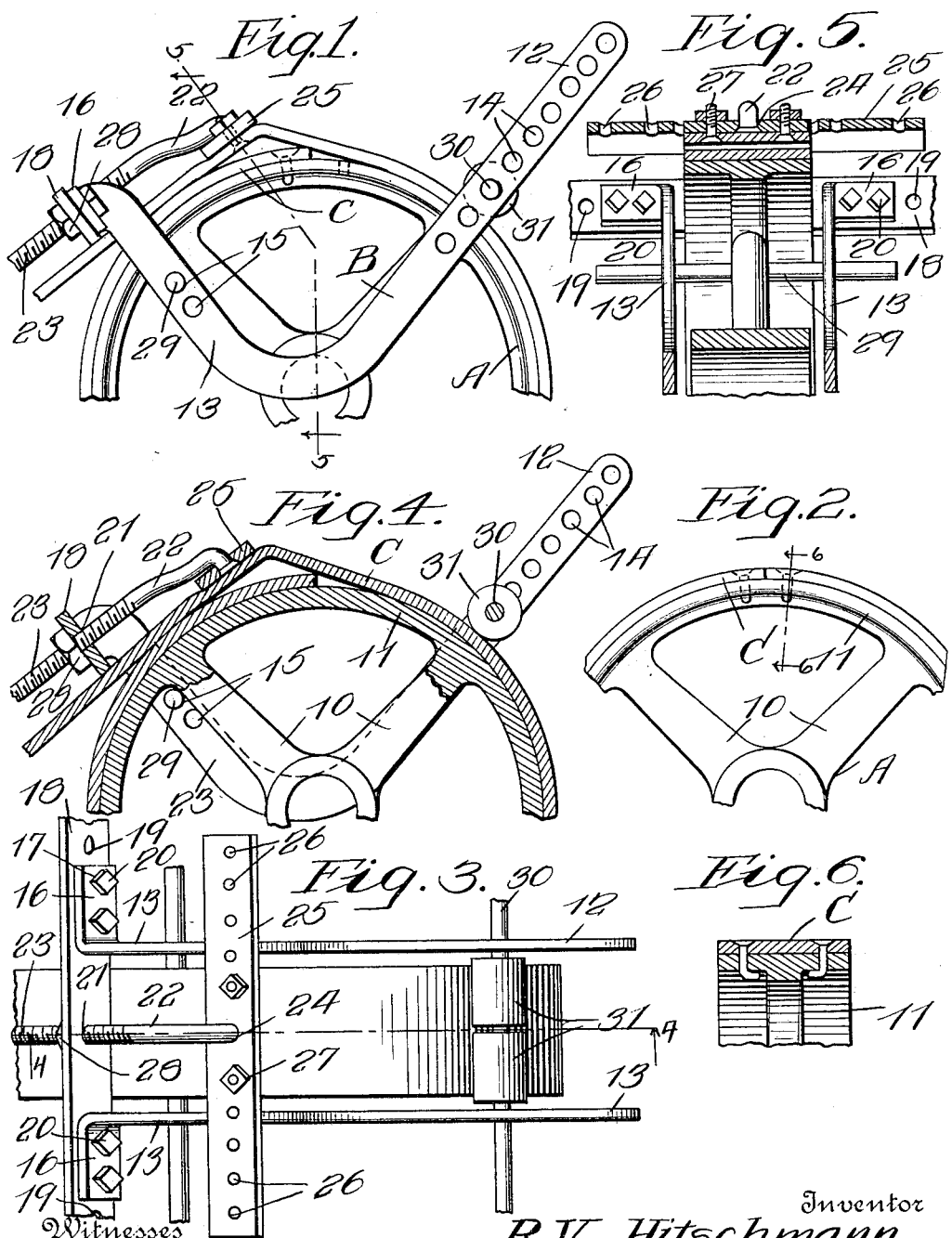
Witnesses
Inventor
R. V. Hitschmann
By
Attorneys

UNITED STATES PATENT OFFICE.

RUDOLF V. HITSCHMANN, OF CLAFLIN, KANSAS.

DEVICE FOR APPLYING LEATHER FACINGS TO PULLEYS.

1,085,424.

Specification of Letters Patent. Patented Jan. 27, 1914.

Application filed April 24, 1913. Serial No. 763.376.

*To all whom it may concern:*

Be it known that I, RUDOLF V. HITSCHMANN, a citizen of the United States, residing at Claflin, in the county of Barton, State of Kansas, have invented certain new and useful Improvements in Devices for Applying Leather Facings to Pulleys; and I do hereby declare the following to be a full, clear, and exact description of the invention, such as will enable others skilled in the art to which it appertains to make and use the same.

This invention relates to devices for applying leather facings to pulleys.

The object of the invention resides in the provision of a device of the character named which will enable leather facings to be applied to the peripheries of pulleys with ease and facility and in an efficient manner.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a pulley showing a strip of leather held around the periphery of the pulley, the one end of the strip being unattached to the periphery; Fig. 2, a partial side elevation showing the strip cut to length and both ends thereof secured to the periphery of the pulley; Fig. 3, a plan view of what is shown in Fig. 1; Fig. 4, a section on the line 4—4 of Fig. 3; Fig. 5, a section on the line 5—5 of Fig. 1, and Fig. 6, a section on the line 6—6 of Fig. 2.

Referring to the drawings A indicates a pulley which includes the usual spokes 10 and rim 11 around which latter a leather facing is adapted to be applied through the instrumentality of the improved device.

The device is shown as comprising a pair of parallel spaced corresponding L-shaped members B each of which includes a long arm 12 and a short arm 13. Each of the long arms 12 is provided with a series of openings 14, while the short arms 13 are provided respectively with openings 15. The outer ends of the short arms 13 are provided respectively with outwardly directed extensions 16 and these extensions are provided with bolt openings 17. Disposed against the extensions 16 is a bar 18 provided at each end with openings 19 adapted to register with the openings 17 and engaged through the registering openings 17 and 19 are bolts 20. In this manner the L-shaped members are connected together in parallel spaced relation as will be obvious. The number of openings 19 is in excess of the number of openings 17 which will permit the L-shaped members B being connected to the bar 18 at different distances apart so that said L-shaped members can be applied in embracing relation to pulleys of different widths. The bar 18 is provided with a central opening 21 in which is slidably engaged a rod 22 one end of which is threaded as at 23 and the other end thereof bent laterally and engaged through an opening 24 formed centrally in a plate 25. The plate 25 is provided on each side of the opening 24 with openings 26 through which are engaged bolts 27. Engaged on the threaded end 23 of the rod 22 is a nut 28 which is adapted to bear against the face of the bar 18 remote from the plate 25 during the operation of the device. Engaged through corresponding openings 15 of the short arms 13 is a rod 29 which is adapted to bear against one of the spokes 10 during the use of the device as will hereinafter appear. Detachably engaged in corresponding openings 14 of the long arms 12 is a rod 30 upon which is journaled between the arms 12 rollers 31. It will be apparent that the rod 30 can be adjusted toward and away from the outer ends of the arms 12 so as to position the rollers 31 to accommodate pulleys of different diameters.

In the use of the device one end of a strip of leather indicated at C, is made fast to the rim 11 by the usual rivets. The strip is then passed around the periphery and secured by the bolts 27 to the plate 25 at a point in said strip that will overlap the fixed end of the strip. The members B are then disposed in embracing relation to the pulley and the rods 29 and 30 applied in the proper manner, the position of the rod 30 being such as to dispose the rollers 31 relatively near the strip C. The nut 28 is then manipulated inwardly of the rod 22 which will force the rod 29 in engagement with a respective spoke 10 and stretch the strip C upon the rim 11. When the strip C has been sufficiently stretched the loose end thereof is secured to the rim by the usual rivets and the strip cut so that the ends thereof will be disposed in abutting relation. The applying of the facing to the pulley is then complete and the device is removed by simply disengaging the rod 29 from the openings 15.

What I claim is:—

A device for applying leather facings to pulleys comprising a bar provided with an opening, parallel L-shaped members having each arm provided with an opening and having the free ends of corresponding arms connected to said bar, a rod slidable through the opening in the bar, a plate secured to one end of said rod, a nut threaded on the other end of the rod, means for securing facing material to said plate, a rod detachably engaged through the openings in the arms of the L-shaped members secured to the bar, for engagement with a spoke of a pulley, a rod detachably secured in the openings in the other arms of said L-shaped members, and rollers journaled on said last named rod between the members.

In testimony whereof, I affix my signature, in the presence of two witnesses.

RUDOLF V. HITSCHMANN.

Witnesses:
　VALENTIN KREMER,
　F. C. CASEY.

---

Copies of this patent may be obtained for five cents each, by addressing the "Commissioner of Patents, Washington, D. C."